(12) United States Patent
Meema (10) Patent No.: US 7,941,430 B2
(45) Date of Patent: May 10, 2011

(54) MULTI-MODE LOCATION BASED E-DIRECTORY SERVICE ENABLING METHOD, SYSTEM, AND APPARATUS

(75) Inventor: Karl E. Meema, Calgary (CA)

(73) Assignee: Poynt Corporation, Calgary AB (CA)

( * ) Notice: Subject to any disclaimer, the term of this patent is extended or adjusted under 35 U.S.C. 154(b) by 118 days.

(21) Appl. No.: 11/910,430

(22) PCT Filed: Mar. 31, 2006

(86) PCT No.: PCT/US2005/012656
§ 371 (c)(1),
(2), (4) Date: Apr. 28, 2008

(87) PCT Pub. No.: WO2006/108037
PCT Pub. Date: Oct. 12, 2006

(65) Prior Publication Data
US 2009/0055353 A1    Feb. 26, 2009

Related U.S. Application Data

(60) Provisional application No. 60/667,915, filed on Apr. 1, 2005.

(51) Int. Cl.
*G06F 7/00* (2006.01)
(52) U.S. Cl. .......... 707/724; 707/708; 707/999.007
(58) Field of Classification Search .......... 707/708, 707/724
See application file for complete search history.

(56) References Cited

U.S. PATENT DOCUMENTS

| | | | | |
|---|---|---|---|---|
| 5,826,261 A * | 10/1998 | Spencer | ............................ | 707/5 |
| 5,873,080 A * | 2/1999 | Coden et al. | ...................... | 707/3 |
| 6,052,439 A * | 4/2000 | Gerszberg et al. | ......... | 379/88.01 |
| 6,275,820 B1 * | 8/2001 | Navin-Chandra et al. | ........ | 707/3 |
| 6,370,527 B1 * | 4/2002 | Singhal | .................. | 707/999.007 |
| 6,988,103 B2 * | 1/2006 | Chithambaram et al. | .... | 707/724 |
| 7,467,131 B1 * | 12/2008 | Gharachorloo et al. | .......... | 707/3 |
| 2001/0001854 A1 * | 5/2001 | Schena et al. | .................... | 705/27 |
| 2002/0052674 A1 * | 5/2002 | Chang et al. | ................... | 700/300 |
| 2003/0004802 A1 * | 1/2003 | Callegari | ........................ | 705/14 |

(Continued)

OTHER PUBLICATIONS

International Search Report and Written Opinion of the International Searching Authority for PCT/US2006/012656 dated Jul. 7, 2006.

*Primary Examiner* — Cheyne D Ly
(74) *Attorney, Agent, or Firm* — Sunstein Kann Murphy & Timbers LLP (57) ABSTRACT

A method prepares a response when providing e-Directory services to a user making a user request for location-based supplier information. The method includes identifying from said user request a desired location for which the user is requesting supplier information, identifying from the user request at least one informational element useful in querying a directory of suppliers, querying a primary directory of suppliers using said desired location and said informational element in order to generate primary supplier hits, querying the world wide web (www) using said desired location and said informational element in order to generate www supplier hits, merging said primary supplier hits with said www supplier hits to create a list of suppliers including a plurality of facts respecting each supplier in said list, sorting all supplier hits in said list by proximity to said desired location, purging any duplicate supplier hits, and formatting said list of suppliers to remove any facts extraneous to presentation over a viewing device to said user.

28 Claims, 4 Drawing Sheets

U.S. PATENT DOCUMENTS

| | | | |
|---|---|---|---|
| 2003/0187755 A1* | 10/2003 | Acharya et al. | 705/27 |
| 2004/0194141 A1* | 9/2004 | Sanders | 725/53 |
| 2005/0065916 A1 | 3/2005 | Ge et al. | |
| 2005/0097005 A1* | 5/2005 | Fargo | 705/26 |
| 2006/0149624 A1* | 7/2006 | Baluja et al. | 705/14 |
| 2007/0208564 A1* | 9/2007 | Tran | 704/254 |

* cited by examiner

MULTI-MODE LOCATION BASED E-DIRECTORY SERVICE ENABLING METHOD, SYSTEM, AND APPARATUS

CROSS REFERENCE TO RELATED APPLICATION

This application is a U.S. national phase of PCT/2006/012656, filed on Mar. 31, 2006 which claims priority from U.S. Provisional Patent Application Ser. No. 60/667,915, entitled "MULTI-MODE LOCATION BASED E-DIRECTORY SERVICE ENABLING METHOD, SYSTEM, AND APPARATUS," filed on Apr. 1, 2005, with inventor Karl E. Meema, all which application are incorporated herein by reference in their entirety.

TECHNICAL FIELD

The present disclosure relates generally to location-based electronic directory services, and particularly but not exclusively relates to using multiple modes of communication to deliver such services.

BACKGROUND INFORMATION

General on-line directory services are known, but most are sorely lacking in accuracy and completeness. The few Location Based directory services to-date require that "Automatic Location Detection" technology be in place on a cellular network—and this technology is not yet available in a commercially practical form. GPS technology is being evaluated as a possible alternative but this requires the replacement of most cell phones in use in North America today. Automatic Location Detection is also a highly contentious issue, as many people simply do not want the carrier or anyone else for that matter, knowing their whereabouts all day, everyday.

Currently, instant messaging, simple messaging system for cell phones, personal digital assistant (PDA) e-mail, and similar protocols rely on text based delivery rather than the graphic protocols supported by the familiar world wide web ("www"). The rising popularity of such text based systems has created new markets and attracted users who demand high-speed messaging over low-bandwidth technologies. To date, large sources of data such as the "Yellow Pages™" or Google™/Yahoo™/MSN™ have been unable to be queried and the results returned over such text based systems in an efficient manner.

Recently, America Online™ ("AOL") through their instant messaging product "AIM" has introduced a service that allows users to look up information from local Yellow Pages™ databases using city or zip code information. Disadvantageously, the problems with AIM include that only one zip code or city is stored per request, per user. Another disadvantage of AIM is its failure to use any command syntax for searching (e.g., to enable searching for a supplier by business name . . . or by a category), such that initial results may be of little relevance and more queries are required to obtain sufficiently relevant results. Further, the AIM search engine does not cross town/city lines, which means that a user on the border between 2 cities will only locate merchants in the city identified—rather than the supplier in his nearest proximity regardless of in which city that supplier operates. Consequently, there is a need for a true location based service that is not limited by simple boundaries and artificial restrictions.

SUMMARY OF THE INVENTION

In one of its aspects, the invention comprises a novel system implementing a novel method for allowing users to retrieve definable information about merchants using Yellow Pages™ and/or other resources, based on the geographic proximity of a supplier to the user at a specific point in time.

According to an embodiment of the present invention, there is provided a method of preparing a response when providing e-Directory services to a user making a user request for location-based supplier information, said method comprising: identify from said user request a desired location for which the user is requesting supplier information; identify from the user request at least one informational element useful in querying a directory of suppliers; query a primary directory of suppliers using said desired location and said informational element, in order to generate primary supplier hits; query the www using said desired location and said informational element, in order to generate www supplier hits; merge said primary supplier hits with said www supplier hits to create a list of suppliers including a plurality of facts respecting each supplier in said list; sort all supplier hits in said list, by proximity to said desired location; purge any duplicate supplier hits; and format said list of suppliers to remove any facts extraneous to presentation over a viewing device to said user.

In order to overcome the disadvantages of the prior art, there is provided a novel technology to address the problems of current technologies in a text-based environment without compromising graphic support as the practical bandwidth of mobile devices increases. A user request may be initiated by a voice call using a cell/Blackberry™/PDA and then be responded to using SMS/IM or even Blackberry mail. A new functionality that is not available in any other known search vehicle today is the ability to allow for separate input and output modes regarding the query. For example, a user will be able to query the service while driving in a car using a voice enabled system and have the output sent to the user's cell phone via SMS or even to the user's Blackberry via email (enabling the user to look at the results of the query after the user has stopped driving). Another feature is the use of a user profile to define market related behavior that the user would like to see. For example, the user will be able to specify that they are part of the Airmiles program and the service will list suppliers who provide Airmiles higher than those that do not.

Advantageously, one embodiment of the invention permits location contextual searching with minimal keystroke interaction from the user. It uses proprietary bandwidth and device management algorithms to ensure the optimum dataflow and user experience whether the subscriber is on a small-screen cell phone, a color PDA or laptop computer, or other device. The architecture is scalable, extendable, and expandable to meet the requirements of any size subscriber base and/or merchant database. It requires no change to the existing digital wireless networks, little or no capital investment on the part of any partners to the system. And, it does not require subscribers buy new "Brew" or "3G" cell phones, since it works on any web enabled digital cell phone today. As more powerful viewing devices emerge, the system integrates with those platforms providing an enhanced experience on larger format devices.

Location context sensitive searches for merchants, products, categories, services can be supported with minimal user keystrokes. Query results are delivered directly to the cell phone, PDA, or "Pocket PC" and formatted to suit each device automatically. These results are organized by proximity to the user's location identifying the results that match the user's query presenting the closest to the user at the top of the list and information about how far away it is. The user can 'drill' down into the menus to obtain further information about the merchant, product or service, even garner driving instruction and maps to help locate the target.

Merchants will also be able to provide specials and coupons to users. Consumers and merchants will be able leverage their affiliations with affinity groups, frequent buyer programs and associations. Subscribers will be able to Opt-in to receive promotions and coupons for designated products, services, or categories. This Opt-in mechanism will allow for simple limited timeframe reception windows, and annual recurring event windows. Consumers now have the opportunity to view product or service availability at a given merchant or service provider and purchase or reserve goods & services on-line.

The accompanying drawings, which are incorporated in and constitute a part of this specification, illustrate example embodiments of the method, system, and apparatus according to the invention and, together with the description, serve to explain the features of the embodiments of the invention.

BRIEF DESCRIPTION OF THE DRAWINGS

One or more embodiments of the present invention will now be described, by way of example only, with reference to the accompanying drawings, in which.

DETAILED DESCRIPTION

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
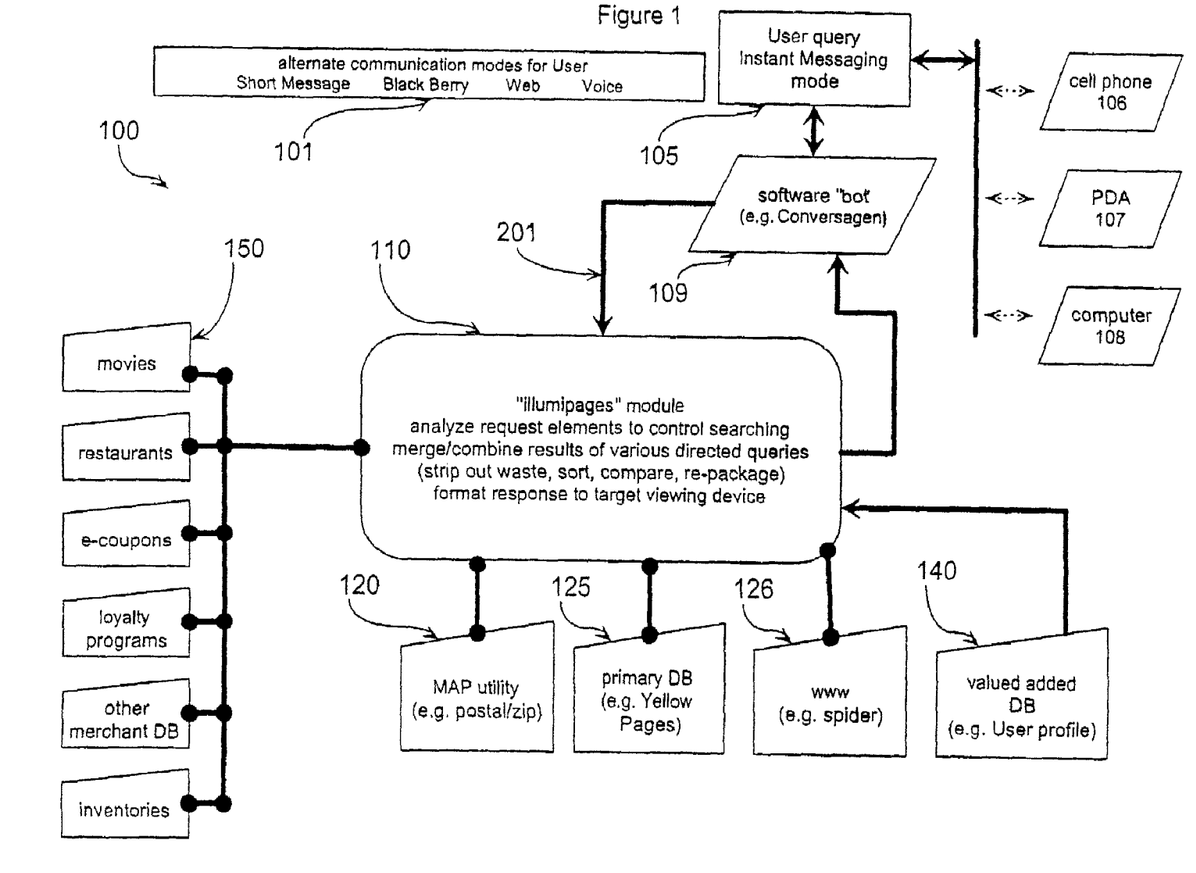
FIG. 1 is a block diagram illustrating one embodiment of the system aspect of the invention.
Figure 2:
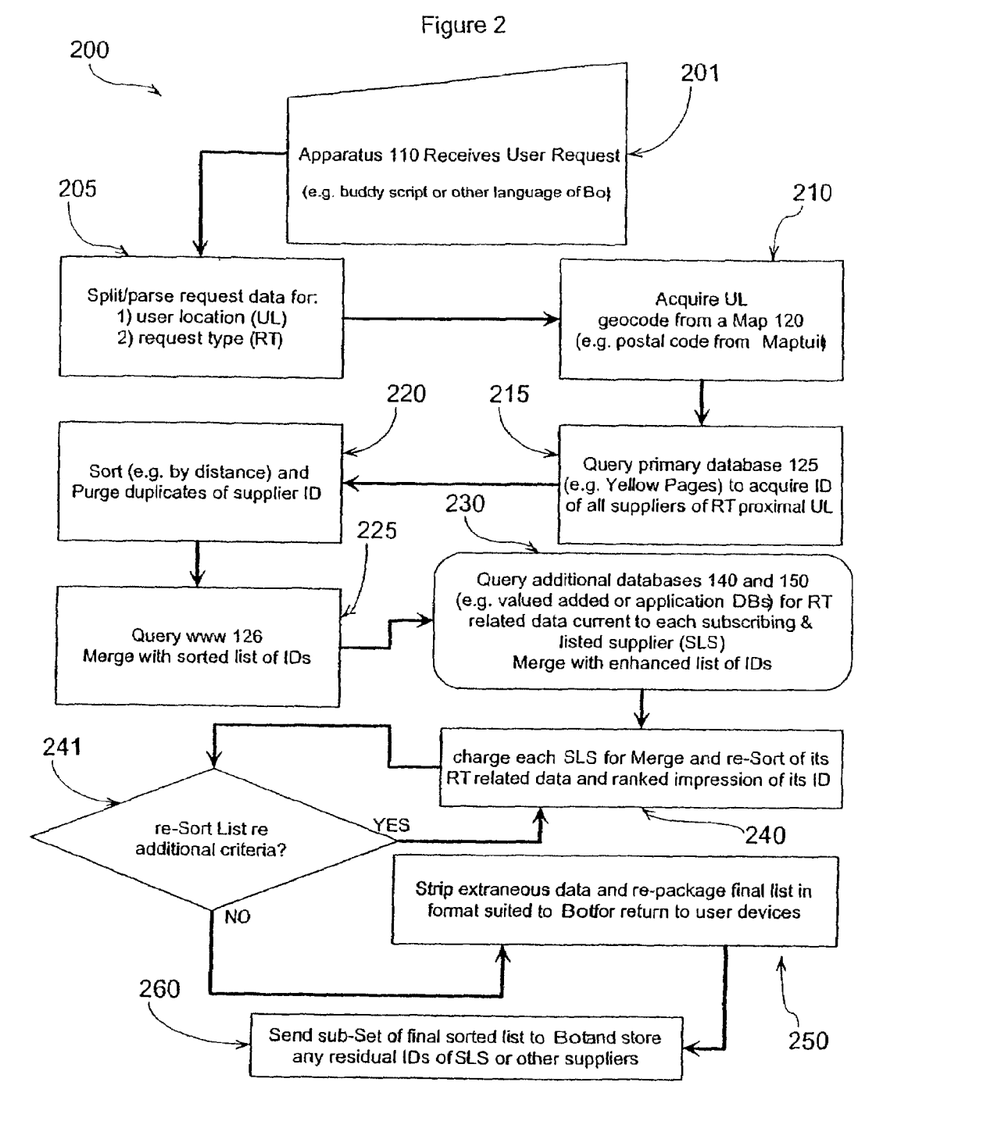
FIG. 2 is a flow chart illustrating one embodiment of the method aspect of the invention as it is implemented by an apparatus.
Figure 3:
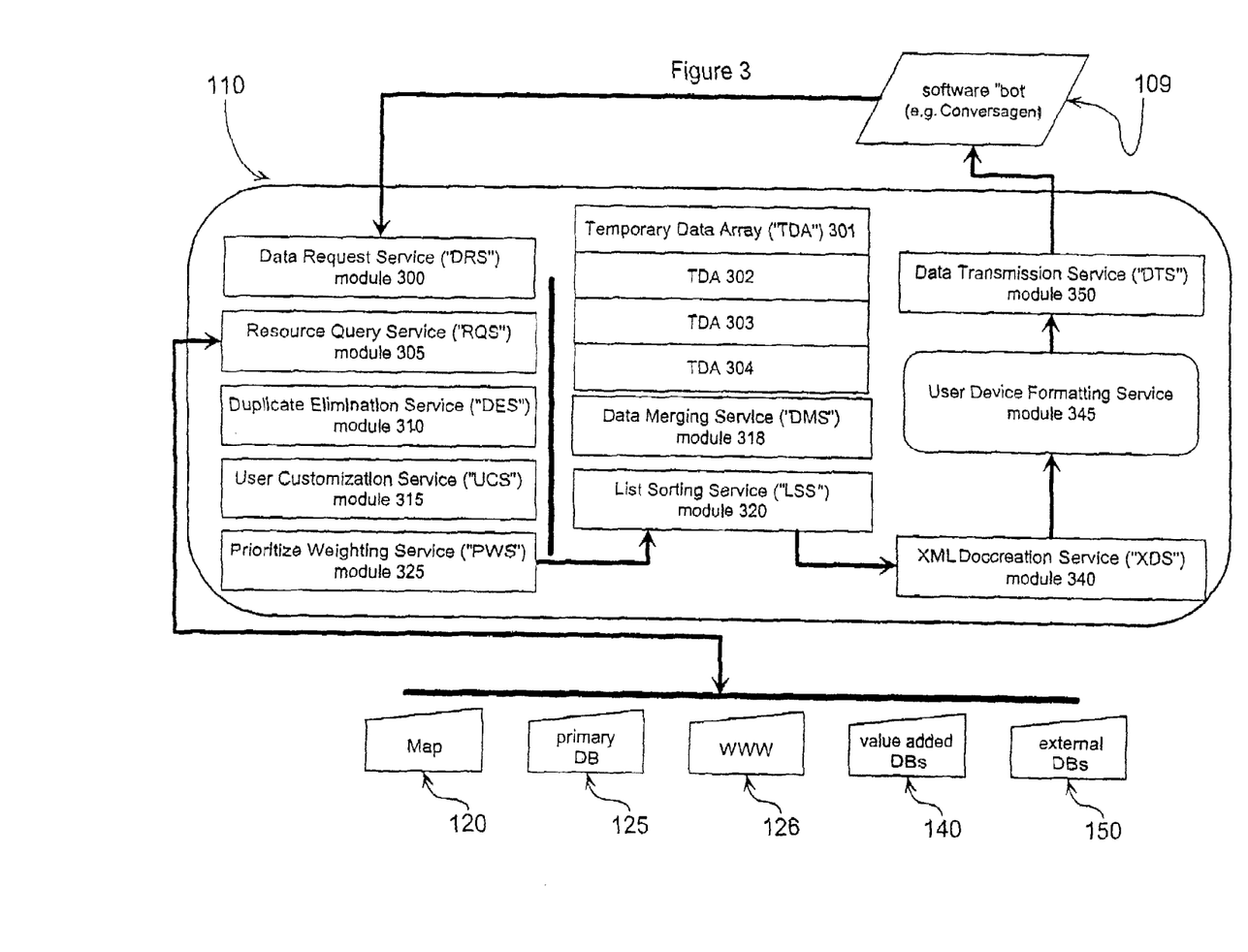
FIG. 3 is a block diagram illustrating one embodiment of the apparatus of the invention.

Referring to FIGS. 1 and 3 there is depicted one embodiment, denoted generally as 100, of the system of the invention for enabling the delivery of an e-Directory service to an identified user (not shown). Via any of alternate modes 101 of communication, or the primary instant messaging mode 105, anyone may request information from said service for delivery to a subscribing identified user carrying any or all of devices 106, 107, or 108. Any suitable communication agent 109 accepts receipt of such request and prepares it (e.g., using buddy script) for use by apparatus 110 in the form of an incoming user request 201 (see also FIG. 2). According to one embodiment of system 100, apparatus 110 is a software module (detailed in FIG. 3) that comparatively purges redundant information (e.g., multiple instances of a single supplier), merges data of different kinds (e.g., web with proprietary formats), and reformats such combined data for efficient consumption by limited bandwidth mobile devices such as cell phone 106, personal digital assistant PDA 107, portable computer 108, or other client device.

For example, according to one embodiment of system 100, apparatus 110 splits or separates (e.g., by parsing a string of data) portions of request 201 in order to determine at least the location of the user or the location for which the user is requesting information, and the nature of the information requested by that user. User location or the requested location is referenced by any suitable means (e.g., postal or zip code) against Map utility 120 (e.g., Maptuit or other mapping engine) that is in turn cross-referenced to a primary data base 125 (e.g., the Yellow Pages™ or other directory), which is typically a directory containing detailed information of the kind the user is entitled (via subscription or otherwise) to access through system 100. Typically, apparatus 100 will also be connected to www 126 permitting it to query (e.g., via Google or spider searching) globally for relevant information that apparatus 110 takes into account through its proprietary algorithmic value judgment (by PWS module 325) when merging web data with other data formats (e.g., the format proprietary to the Yellow Pages™) in the course of assembling the most relevant content for its response to each user request.

In some cases the user, for whom request 201 has been made, will have enabled the storage of preference information in valued-added data base 140 (accessed by UCS module 315) in order to permit an even more effective matching of his request with supplier information selected by apparatus 110 based on cross-referencing Map utility 120 with primary data base 125. Further, in the event that the subscribing user or the subscribing suppliers have enabled enhanced service features, apparatus 110 will attempt to match information from external database array 150 to suppliers selected from primary data base 125 based on a range of criteria, including those available, if any, in valued-added data base 140.

Once a preliminary list matching potential suppliers of user request 201 has been assembled (and stored in TDA 301), apparatus 110 eliminates all duplicate entries of suppliers and then sorts and compares the surviving suppliers in order to create a prioritized list of suppliers who best match the criteria applicable to the instance of user request 201 being processed. As each subscribing user makes additional requests from system 100, the preference information, if any, stored in valued-added data base 140 will grow permitting apparatus 110 to better refine its matching and prioritization functions. Once apparatus 110 has completed all enabled processing of user request 201, it prepares its response for delivery to the identified user for viewing over one or more specific devices (e.g., devices 106, 107, or 108) in a format that is efficient for reception and display by the specified devices. For example, when sending its response out to cell phone 106, apparatus 110 may strip out non-essential graphic information that is available from the supplier (e.g., of the menu of a restaurant), but not desired at this time. The stripped-down and priority-sorted list of suppliers is then repackaged into definable sized blocks of data, in a format suited to transmission via a particular mode (e.g., Instant Messaging 105), and returned to communication agent 109 for delivery to cell phone 106 and any other devices requested.

It is understood that, according to one embodiment of system 100, the functionality of communication agent 109 could, under suitable license, also be incorporated in apparatus 110.

It is further to be understood that, according to an embodiment of system 100, a subscribing user may send request 201 using one communication mode and receive the response of apparatus 110 via a completely different mode. For example, a business person en route to her hotel may wirelessly request information respecting "tee times" within a given distance of her hotel, using instant messaging and a script programmed into her PDA—then receive a more detailed and appealing graphic response using her laptop computer 108 in the hotspot at the bar of her hotel after she changes into suitable attire. In the comfort of the hotel, the user is better able to select a tee time after reviewing the web-sites using the links supplied by apparatus 110 to her computer 108 . . . but not delivered to her cell phone 106.

Referring to FIG. 2, there is depicted one embodiment, denoted generally as 200, of the method of the invention wherein at step 201 apparatus 110 receives, typically from an agent 109, a user request for information of one or more of a limited number of defined types. It is to be understood that the incoming request of step 201 may arrive via almost any means of communication with which system 100 is designed to cooperate. At step 205, the incoming request message is split (e.g., by parsing) into any number of component parts based on the particularity with which the user has made his request, such as user location (UL) and/or request type (RT).

According to one embodiment of method 200, using the components isolated at step 205, at step 210 system 100 economically acquires standardized information respecting user location from a resource such as a third party (e.g., Maptuit or other mapping engine) database of postal codes or zip codes. According to an alternate embodiment of the method of the invention, step 210 may be performed based on reverse phone lookup, city name, or even a particular intersection of streets within a city. And, according to an alternate embodiment of system 100, user location information may (upon consent of the suitably equipped user) be calculated from GPS determined coordinates or locally triangulated using cell phone towers. Further, as "911" emergency service location grids expand in each municipality, various governmental bodies and authorized carriers will make resources available that may be used by system 100 as an alternate means to execute step 210.

Having, by any suitable means, determined proximal what location the user requests what information, apparatus 110 can execute step 215 by querying a primary database 125 (e.g., the Yellow Pages™ directory) or similar resource from which suppliers of the kind identified by the user making a request may be located. At step 215 a raw list of any number of possible suppliers is assembled, including a substantial but varying amount of detailed information respecting those suppliers so identified. At step 220 that list is sorted based on a range of definable criteria (e.g., proximity, cost, inventory on hand) for the purpose of eliminating duplicate entries while creating a prioritized initial list in which each supplier is unique.

Enhancing the prioritized initial list resulting from step 220, optionally begins at step 225 where queries of www 126 gather additional relevant information respecting suppliers already on said list and additional suppliers not on that list may be taken into account by apparatus 110. Additional processing (e.g., merging new suppliers or new information respecting listed suppliers) of this list occurs at step 225 potentially resulting in both new supplier awareness impressions and altered ranking. Further optional enhancement of the list resulting at step 225 may take place at step 230 where internal databases 140 (e.g., user profile information collected and accumulated only upon subscriber consent) and/or additional external databases 150 are queried (to cross reference promotional and other information respecting identified suppliers) by apparatus 110 for supplier inventory and other relevant information respecting a wide range of matters related to the type of request made by the user. Step 230 results in a list that has been repeatedly scrutinized and reshuffled based on a range of increasingly relevant considerations, advantageously making it possible for system 100 to deliver a very high-quality response to the subscribing user.

If new information relevant to the request content of step 205 is located for one or more listed suppliers, then this may at step 241 change the ranking on the list in a manner that results in a given supplier being exposed to a user who would otherwise not have any impression of that supplier. Consequently, at step 240 there is optionally an opportunity for an operator of system 100 to acquire additional revenue by charging (either the user or the supplier or both) for the additional processing of step 230, the altered ranking, or the related exposure.

According to one embodiment of method 200 at step 250, all extraneous data is stripped from the description of each listed supplier, making the list content ready to send to the particular user. Since each additional query may gather different elements of supplier information, some of which are not suited for transmission to the specified user devices, step 250 reformats the final list so that any appropriate value-added information may be included with the essential basic information respecting those identified suppliers to whom it applies, in order to prepare the assembled data set for efficient viewing on any one or more of a number of user devices.

It is to be understood that steps 220, 225, 230, and 250 may be performed in a number of different sequences that may influence the efficiency of executing method 200, without materially affecting the outcome of all related processing. In one embodiment, at least some of the steps 220, 225, 230, and 250, and/or at least some of the other steps or other functionality shown and described herein, may be implemented in software or other machine-readable instruction stored on a machine-readable medium, and executable by one or more processors.

According to one embodiment of method 200 at step 260, system 100 returns information respecting a sub-set of suppliers to the user either directly or through an agent. As occurs with search engines, frequently, there will be many more possible suppliers located than the user needs, such that on a limited band-width device the user may require that only the "top 5" be displayed. In these circumstances, system 100 may be set to capture and store only the top 40 suppliers, 35 of which will be held temporarily in reserve in the event that the user wishes to see more than the top 5. A person of skill in the art will understand that many variations are possible in managing the results of the series of queries and sorting operations executed during the implementation of method 200 by system 100.

Figure 4:
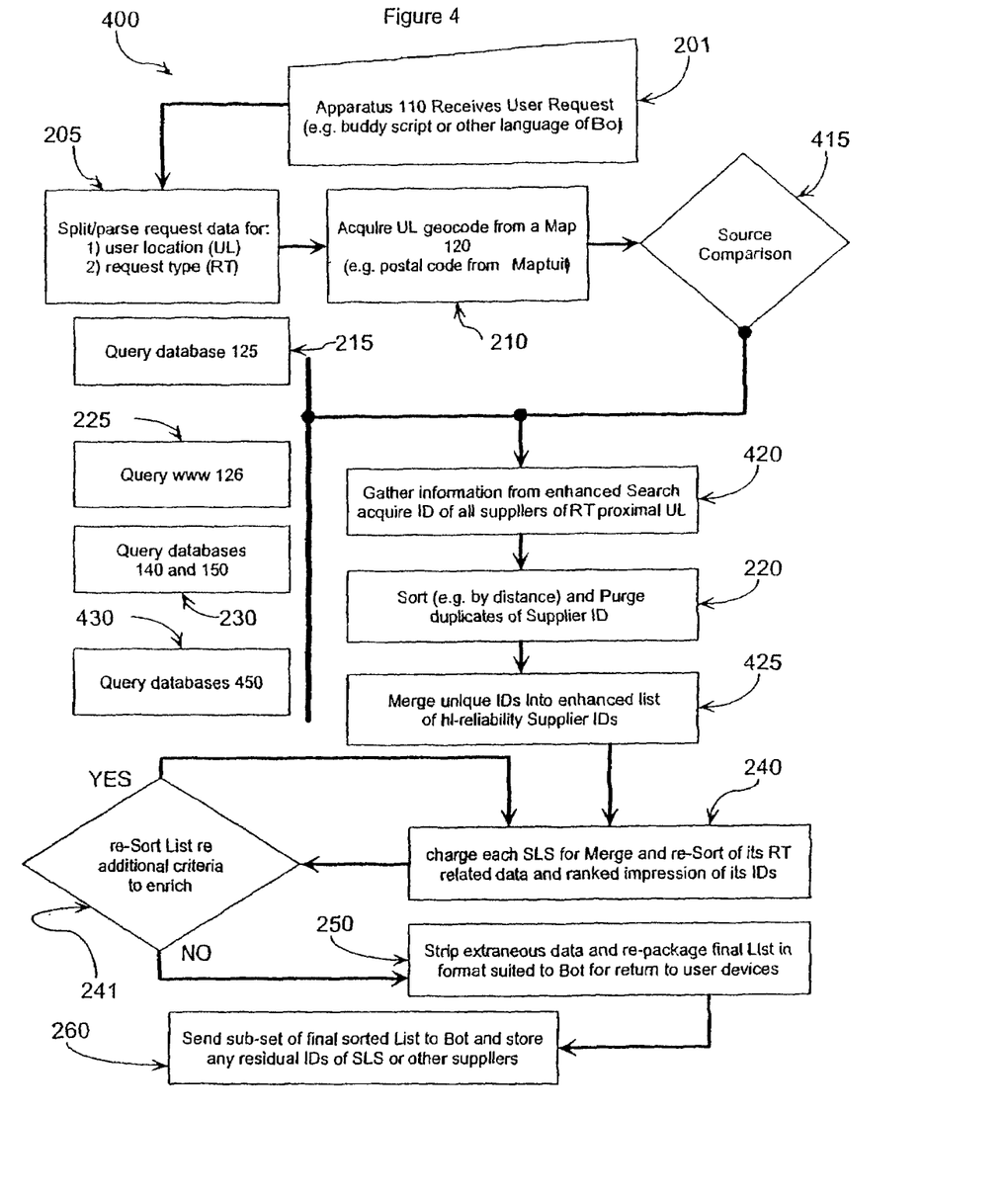
FIG. 4 is a flow chart illustrating another embodiment of the method aspect of the invention as it is implemented by an apparatus.

Referring to FIG. 3 there is depicted one embodiment, of apparatus 110 shown connected to an agent 109 for communicating over one or more modes such as instant messaging. Data Request Service (DRS) 300 accepts a data string (not shown) from agent 109 either pre-parsed or serially. Memory registers or Temporary Data Array (TDA) 301-304 are shown as an example of the means by which the string of data may be efficiently manipulated by any suitable processing device and communication bus. Once the required location and request type information is isolated, "services" or modules such as Request Query Service (RQS) 305 are used to gather and analyze information from a wide range of sources (e.g., databases 120 to 150). As described in connection with FIG. 2, duplication is eliminated in the supplier "hits" collected, merging takes place, any customization of the response made possible by user profiling by User Customization Service (UCS) module 315 is effected, the results are weighted by Prioritize Weighting Service (PWS) module 325, and the list is re-sorted by List Sorting Service (LSS) 320 in that context to produce a high-quality informational content for the subscribing user. It is to be understood that PWS module 325 may be used to compare data sources based on a wide range of criteria (e.g., reliability, cost, speed of reply, richness of content returned, subscribing and listed supplier (SLS) fees paid, et cetera) before querying of sources on the database bus may proceed. Advantageously as set out below in method 400, this can expedite getting better information to the user sooner. Data Merging Service (DMS) module 318 is used to perform steps 225 and 425 as further defined herein. Similarly LSS module 320 and Duplicate Elimination Service (DES) module 310 are each used to perform step 220 as further defined herein. Advantageously, in addition to improved relevance for the mobile user, XML Doccreation Service (XDS) module 340 and User Device Formatting Service (UDFS) module 345 combine to format the response in a manner that is optimal for viewing on the device or devices specified by that user. This efficient combination results in a less stressed, more satisfied user who spends less time keying requests and more time using the results. It is to be understood that XDS module 340 is not limited to XML document creation, but may use any suitable format such as: HTML, script, or text or other formats in alternate embodiments hereof.

Referring to FIG. 4, there is depicted an alternate embodiment, denoted generally as 400, of the method 200 of the invention wherein at step 201 apparatus 110 receives, typically from an agent 109, a user request for information of one or more of a limited number of defined types. At step 205 the incoming request message is split (e.g., by parsing) into any number of component parts based on the particularity with which the user has made his request. According to an embodiment of method 400, using the components isolated at step 205, at step 210 system 100 acquires standardized information respecting user location from a variety of sources as all described above in relation to method 200.

According to method 400, having, by any suitable means, determined proximal what location the user requests what type of information, apparatus 110 can next execute step 415 (to expedite the query process) by first comparing the available database sources (125, 126, 140, 150, and 450) based on historical information regarding their applicability to the UL and RT (individually or in combination) of the user request in process. It is to be understood that over time the apparatus 110 can "learn" or accumulate reliability data in relation to each available database source for particular UL zones and/or each RT category. If, for example, the (e.g., Yellow Pages) primary database 125 accumulates a poor track record of reliability in relation to high-turnover business establishments such as pizza parlours, then the tables or any other suitable form of historical records of source comparison step 415 can be used for source comparison by PWS module 325 in apparatus 110 to prevent system 100 querying primary database 125 each time the RT includes the pizza parlour category of restaurant. Similarly, if it is only pizza parlours in a low-rent district of a given group of cities that have historically been unreliable, then the combination of RT and UL could be used to filter queries and allow that type of RT to be queried outside the ULs in which pizza parlours are known to be prone to failure.

Once any "query filters" have been applied to the user request in process, and the source comparison step by PWS module 325 is complete, gather step 420 may proceed with any number of queries of any of the surviving qualified and available database sources (125, 126, 140, 150, and 450) that system 100 can communicate with at the time of the query. This number of queries may be capped for practical viewing limitations (imposed either by a user or the device that he uses), or a particular SLS can pay a fee to ensure that their source is queried on every relevant user request as long as it survives the query filter criteria.

It is to be understood that source comparison by PWS module 325 may be driven by a wide range of criteria that depend on user preferences, service level, and RT. For example, criteria that may apply include: historical reliability of source, last date source was updated, real time feedback direct from SLS, physical nature of item sought (e.g., playgrounds don't move, but selection may vary), internally generated verified data (e.g., high confidence) or volunteer public source without internal verification, or other criteria.

Further optional enhancement of the list resulting at step 425 may occur where internal databases 140 (e.g., user profile information collected and accumulated only upon subscriber consent) and/or additional external databases 150 were queried (to cross reference promotional and other information respecting identified suppliers) supplier inventory and other relevant information respecting a wide range of matters related to the type of request made by the user.

Once all of the query responses have been gathered in TDA 301 at step 420, apparatus 110 executes sort and purge step 220 in substantially the same manner as set out above in method 200. The result is a list of unique supplier IDs who are believed to be highly reliable in terms of their availability proximal the UL associated with the user request in process at that time. The ID merger step 425 delivers a sound basis on which to charge, a fee at step 240, to each SLS whose ID survived: filtering, sorting, and merging. Advantageously, and as the usage of system 100 increases, if additional sorting criteria are made available by particular SLSs who wish to supply a richer variety of data respecting their offerings at a given time, then step 241 permits a subset of qualifying SLSs to resort according to that richer information for the purpose of raising their ranking in the final output that goes to the user device at step 260. For example, if a user is looking for not only the nearest Tim Hortons that is open, but also one that has beef barley soup on its lunch menu at that time and on that day, then the enterprising manager of a given franchise location may choose to upload a more detailed and rich set of data including the day's menu in response to a query based on a more detailed RT. It is understood that if a user transmits a more detailed user query 105, then this could affect the breadth of the radius of the search around his then UL. If the nearest Tim Horton's that qualifies is a significant distance away from the UL, then the user may still see it included in his step 260 reply, but he may choose to move down the list to either an alternate source of beef barley soup, or a closer restaurant carrying the same category (e.g., variety of lunch food including soups) of RT but who does not expressly indicate their menu in sufficient detail to confirm or deny the availability of that specific flavour of soup.

Once any resorting, at step 241, according to richness of information in the RT has been completed, the system 100 proceeds to step 250 whereupon all extraneous data is stripped from the description of each listed supplier, making the list content ready to send to the particular user. In a manner similar to that of method 200, since each additional query may gather different elements of supplier information, some of which are not suited for transmission to specified user devices, step 250 reformats the final list so that any appropriate value-added information may be included with the essential basic information respecting those identified suppliers to whom it applies, in order to prepare the assembled data set for efficient viewing on any one or more of a number of user devices.

It is to be understood that steps 415, 420, 220, 425, 241 and 250 may be performed in a number of different sequences that may influence the efficiency of executing method 400, without materially affecting the outcome of all related processing.

According to one embodiment of method 400 at step 260, system 100 returns information respecting a sub-set of suppliers to the user either directly or through an agent such that the implementation of method 400 by system 100 is parallel to the above description of method 200.

All of the above U.S. patents, U.S. patent application publications, U.S. patent applications, foreign patents, foreign patent applications and non-patent publications referred to in this specification are incorporated herein by reference, in their entirety.

Although the disclosure describes and illustrates preferred embodiments of the invention, it is to be understood that the invention is not limited to these particular embodiments. Many variations and modifications will now occur to those skilled in the art of resource allocation. For full definition of the scope of the invention, reference is to be made to the appended claims.

What is claimed is:

1. A method of preparing a response when providing e-Directory services to a user making a user request for location-based supplier information, said method comprising:
    receiving, in an apparatus, a user request for location-based supplier information;
    identifying, through use of automatic location detection in a mobile communications device, a desired location for which the user is requesting supplier information;
    identifying from the user request at least one informational element useful in querying an e-directory of suppliers;
    causing the apparatus to query, responsive to the user request, a primary e-directory of suppliers using said desired location and said informational element, in order to generate primary supplier hits;
    causing the apparatus to query, responsive to the user request, a world wide web (www) using said desired location and said informational element, in order to generate supplier web page hits;
    causing the apparatus to merge said primary supplier hits with said supplier web page hits to create a list of suppliers including a plurality of facts respecting each supplier in said list;
    causing the apparatus to sort the list of suppliers based on proximity to the desired location;
    causing the apparatus to purge any duplicate supplier hits;
    causing the apparatus to format said list of suppliers to remove any facts extraneous to presentation over a viewing device to said user; and
    causing the apparatus to deliver the list of suppliers to the viewing device.

2. The method of claim 1, further comprising querying additional databases using the desired location and the informational element to generate additional supplier hits or to acquire additional facts respecting suppliers on said list.

3. The method of claim 2 wherein the additional facts are in respect of current supplier promotions, additional supplier services, or supplier hours of operation.

4. The method of claim 1 wherein said viewing device is a cell phone, PDA, or mobile computer.

5. The method of claim 1 wherein formatting supplier hits includes determining from the user request a desired viewing device and re-packaging the supplier hits into a format suited to said desired viewing device.

6. A method of preparing a response when providing e-Directory services to a user making a user request for supplier information, the method comprising:
    receiving, in an apparatus, a user request for location-based supplier information;
    identifying, through use of automatic location detection in a mobile communications device, a desired location for which the user is requesting supplier information;
    identifying from the user request at least one informational element usable in querying an e-directory of candidate suppliers;
    causing the apparatus to query, responsive to the user request, a primary e-directory of suppliers using the desired location and the informational element, in order to generate first supplier hits;
    causing the apparatus to query, responsive to the user request, a world wide web using the desired location and the informational element, in order to generate supplier web page hits;
    causing the apparatus to merge the first supplier hits with the supplier web page hits to create a list of suppliers and a plurality of facts associated with each supplier on the list; and
    causing the apparatus to sort the list of suppliers based on proximity to the desired location.

7. The method of claim 6 further comprising at least one of:
    purging any duplicate suppliers on the list; and
    formatting the list of suppliers to remove any facts extraneous to presentation on a client device of the user.

8. The method of claim 6, further comprising querying a third data source using the desired location and the informational element, in order to generate third supplier hits or to acquire additional facts associated with the suppliers on the list.

9. The method of claim 8 wherein the additional facts include information associated with supplier promotions, additional supplier services, or supplier hours of operation.

10. The method of claim 6 wherein the user request is sent from a first device, the method further comprising determining from the user request a second device, different from the first device, to send the list of suppliers and their associated facts.

11. The method of claim 10 wherein the first device is a wired device, and wherein the second device is a wireless device.

12. The method of claim 6, further comprising performing a comparison based on historical reliability data for each of the primary e-directory and world wide web before querying the primary e-directory and world wide web, to determine which of the primary e-directory and world wide web is more relevant for the user request.

13. The method of claim 6, further comprising:
    additionally querying the primary e-directory and world wide web using more detailed data relative to the information element;
    resorting the list based on the more detailed data to rank the suppliers on the resorted list; and charging each supplier on the resorted list with a fee to have such suppliers ranked on the list.

14. An article of manufacture usable with e-Directory services, the article of manufacture comprising:
a machine-readable medium having instructions stored thereon that are executable by a processor to allow the processor to prepare a response to a user that is making a user request for supplier information, by:
receiving, in an apparatus, the user request;
identifying, through use of automatic location detection in a mobile communications device, a desired location for which the user is requesting supplier information;
identifying from the user request at least one informational element usable in querying candidate suppliers;
causing the apparatus to query, responsive to the user request, a primary e-directory of suppliers using said desired location and said informational element, in order to generate first supplier hits;
causing the apparatus to query, responsive to the user request, a world wide web using said desired location and said informational element, in order to generate supplier web page hits;
causing the apparatus to merge said first supplier hits with said supplier web page hits to create a list of suppliers including a plurality of facts associated with each supplier in said list;
causing the apparatus to sort the list of suppliers based on proximity to the desired location;
causing the apparatus to purge duplicate supplier hits;
causing the apparatus to format said list to remove any extraneous facts; and
causing the apparatus to format said list to a format that can be presented by a viewing device of said user.

15. The article of manufacture of claim 14 wherein the machine-readable medium further includes instructions stored thereon that are executable by the processor the response, by determining from the user request a second device, different from the first device, to send the list of suppliers and their associated facts.

16. The article of manufacture of claim 14 wherein the machine-readable medium further includes instructions stored thereon that are executable by the processor to allow the processor to prepare the response by performing a comparison based on historical reliability data for each of the primary e-directory and world wide web before querying the primary e-directory and world wide web, to determine which of the primary e-directory and world wide web is more relevant for the user request.

17. The article of manufacture of claim 14 wherein the machine-readable medium further includes instructions stored thereon that are executable by the processor to allow the processor to prepare the response by:
additionally querying the primary e-directory and world wide web using more detailed data relative to the information element;
resorting the list based on the more detailed data to rank the suppliers on the resorted list; and
charging each supplier on the resorted list with a fee to have such suppliers ranked on the list.

18. A system for preparing a response when providing e-Directory services to a user making a user request for supplier information, the system comprising:
means for receiving, in an apparatus, a user request for location-based supplier information;
means for identifying, through use of automatic location detection in a mobile communications device, a desired location for which the user is requesting supplier information;
means for identifying from the user request at least one informational element usable in query candidate suppliers;
means for querying, responsive to the user request, a primary e-directory of suppliers using the desired location and the informational element, in order to generate first supplier hits;
means for querying, responsive to the user request, a world wide web using the desired location and the informational element, in order to generate supplier web page hits;
means for merging the first supplier hits with the supplier web page hits to create a list of suppliers and a plurality of facts associated with each supplier on the list;
means for sort the list of suppliers based on proximity to the desired location;
means for delivering the list of suppliers and their associated facts to a client device of the user;
means for purging any duplicate suppliers on the list; and
means for formatting the list of suppliers to remove any facts extraneous to presentation on the client device of the user.

19. The system of claim 18 wherein the user request is sent from a first device, the system further comprising means for determining from the user request a second device, different from the first device, to send the list of suppliers and their associated facts.

20. The system of claim 18, further comprising:
means for performing a comparison based on historical reliability data for each of the primary e-directory and world wide web before querying the primary e-directory and world wide web, to determine which of the primary e-directory and world wide web is more relevant for the user request;
means for additionally querying the primary e-directory and world wide web using more detailed data relative to the information element;
means for resorting the list based on the more detailed data to rank the suppliers on the resorted list; and
means for charging each supplier on the resorted list with a fee to have such suppliers ranked on the list.

21. An e-Directory service apparatus to prepare a response to a user making a user request for supplier information, the apparatus comprising:
a data request service module to receive the user request;
a request query service module operatively associated with the data request service to identify, through use of automatic location detection in a mobile communications device, a desired location for which the user is requesting supplier information and to identify from the received user request at least one informational element usable in querying candidate suppliers, the request query service module being capable to query, responsive to the user request, a primary e-directory of suppliers using the desired location and the informational element in order to generate first supplier hits and to query, responsive to the user request, a world wide web using the desired location and the informational element in order to generate supplier web page hits;
a data merging service module operatively associated with the request query service module to merge the first supplier hits with the supplier web page hits to create a list of suppliers and a plurality of facts associated with each supplier on the list;

at least one module operatively associated with the data merging service module, including a list sorting module to sort the list of suppliers based on proximity to the desired location;

a duplicate elimination service module to purge any duplicate suppliers on the list;

a user customization service module to customize the list of suppliers and their associated facts based on user preferences;

a prioritize weighting service module to weigh the suppliers on the list based on criteria; and at least one formatting service modules to format the sorted list into a form suitable for a client device of the user.

22. The apparatus of claim 21, further comprising: a memory location to store at least some data used by or generated by one or more of the modules; and a data transmission service module to send the sorted list, which has been formatted into the suitable form by the at least one formatting device, to the client device of the user.

23. The apparatus of claim 21 wherein the prioritize weighting service module is capable to weigh the suppliers on the list based on at least one of proximity to the desired location, historical reliability data, and detailed data associated with each supplier usable to rank each supplier on the list.

24. The apparatus of claim 21 wherein the user customization service module is also capable to determine from the user request a receiving device, different from a sending device that sent the user request, to receive the list of suppliers and their associated facts.

25. The method of claim 1 wherein the user request is made using a first communication mode, the method further comprising delivering the list of suppliers to the user using a second communication mode that is different from the first communication mode.

26. The article of manufacture of claim 14 wherein the user request is made using a first communication mode, the machine-readable medium further having instructions stored thereon that are executable by the processor to allow the processor to deliver the list of suppliers to the user using a second communication mode that is different from the first communication mode.

27. The system of claim 18 wherein the user request is made using a first communication mode, the system further comprising means for delivering the list of suppliers to the user using a second communication mode that is different from the first communication mode.

28. The apparatus of claim 21 wherein the user request is made using a first communication mode, the apparatus further comprising a delivery service module operatively associated with the data merging module to deliver the list of suppliers to the user using a second communication mode that is different from the first communication mode.

* * * * *

UNITED STATES PATENT AND TRADEMARK OFFICE
CERTIFICATE OF CORRECTION

| | | |
|---|---|---|
| PATENT NO. | : 7,941,430 B2 | Page 1 of 1 |
| APPLICATION NO. | : 11/910430 | |
| DATED | : May 10, 2011 | |
| INVENTOR(S) | : Karl E. Meema | |

It is certified that error appears in the above-identified patent and that said Letters Patent is hereby corrected as shown below:

On title page, item (86) - PCT No.,
replace "PCT/US2005/012656"
with --PCT/US2006/012656--

In the Claims
In Col. 12, line 20, Claim 12
replace "means for sort the list of suppliers"
with --means for sorting the list of suppliers--

Signed and Sealed this
Seventeenth Day of June, 2014

Michelle K. Lee
*Deputy Director of the United States Patent and Trademark Office*